United States Patent
Lee (10) Patent No.: US 12,425,188 B2
(45) Date of Patent: Sep. 23, 2025

(54) SHA-256 QUANTUM CIRCUIT DESIGN APPARATUS AND METHOD

(71) Applicant: ELECTRONICS AND TELECOMMUNICATIONS RESEARCH INSTITUTE, Daejeon (KR)

(72) Inventor: Jong Heon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 518 days.

(21) Appl. No.: 17/979,379

(22) Filed: Nov. 2, 2022

(65) Prior Publication Data

US 2023/0163949 A1   May 25, 2023

(30) Foreign Application Priority Data

Nov. 23, 2021 (KR) .................. 10-2021-0162766
Mar. 31, 2022 (KR) .................. 10-2022-0040260

(51) Int. Cl.
*H04L 9/06* (2006.01)
*H04L 9/08* (2006.01)

(52) U.S. Cl.
CPC .......... *H04L 9/0643* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 10,171,088 B1* | 1/2019 | Kim | H03K 19/195 |
| 2019/0244128 A1* | 8/2019 | Choi | G06N 10/20 |
| 2021/0119777 A1* | 4/2021 | Ghosh | H04L 9/3247 |
| 2022/0224514 A1* | 7/2022 | Ghosh | H04L 9/50 |

FOREIGN PATENT DOCUMENTS

| | | | |
|---|---|---|---|
| KR | 1020210062380 A | 5/2021 |
| KR | 102322431 B1 | 11/2021 |

OTHER PUBLICATIONS

Jongheon Lee at al., "T-depth reduction method for efficient SHA-256 quantum circuit construction", IET Inf. Secur. 1-20 (2022). Jun. 28, 2022.

Matthew Amy et al., "Estimating the cost of generic quantum pre-image attacks on SHA-2 and SHA-3", arXiv:1603.09383v3 [quant-ph] Nov. 30, 2016.

Panjin Kim et al., "Time-space complexity of quantum search algorithms in symmetric cryptanalysis: applying to AES and SHA-2", Quantum Information Processing (2018) 17:339. Oct. 31, 2018.

* cited by examiner

*Primary Examiner* — Joseph P Hirl
*Assistant Examiner* — Hassan Saadoun
(74) *Attorney, Agent, or Firm* — Rabin & Berdo, P.C.

(57) ABSTRACT

Disclosed herein SHA-256 quantum circuit design apparatus and method. According to an embodiment of the present disclosure, there is provided an SHA-256 quantum circuit design apparatus comprising: a reception unit configured to receive an SHA-256 quantum circuit having a length of a critical path consisting of six adders; and a design unit configured to design a first SHA-256 quantum circuit having the critical path length reduced to a first value by applying a path balancing technique to the received SHA-256 quantum circuit and to design a second SHA-256 quantum circuit having the critical path length reduced to a second value by applying the path balancing technique to the first SHA-256 quantum circuit to output a d+T1 value first.

12 Claims, 5 Drawing Sheets

SHA-256 QUANTUM CIRCUIT DESIGN APPARATUS AND METHOD

CROSS REFERENCE TO RELATED APPLICATION

The present application claims priority to Korean Patent Applications 10-2021-0162766, filed Nov. 23, 2021, and 10-2022-0040260, filed Mar. 31, 2022, the entire contents of which is incorporated herein for all purposes by this reference.

BACKGROUND OF THE INVENTION

1. Field of the Invention

The present disclosure relates to SHA-256 quantum circuit design technology, and more particularly, to an SHA-256 quantum circuit design apparatus and method for reducing an execution time of a quantum circuit by reducing a critical path length that determines the execution time of the quantum circuit.

2. Description of the Related Art

An SHA is an abbreviation for a secure hash algorithm. It consists of five hash functions designed by the National Security Agency (NSA) and published by the National Institute of Standards and Technology (NIST). One of them is SHA-2. SHA-2 is intended to provide a higher level of security than SHA-1 and is a set of secure hash functions including SHA-224, SHA-256, SHA-384 and SHA-512 developed by the NSA. SHA-224 and SHA-256 are similar algorithms based on a 32-bit word length, generating 224-bit and 256-bit digests. SHA-384 and SHA-512 are based on 64-bit words and generate 384-bit and 512-bit digests.

SHA-2 is computationally more complex than SHA-1 and relies on logic operations and rotation as well as carry propagate additions. The critical path for a round of SHA-2 operations consists of four consecutive propagation additions where adder inputs are determined by complex logic and rotation functions.

SUMMARY OF THE INVENTION

An object of the present disclosure is to provide an SHA-256 quantum circuit design apparatus and method for reducing an execution time of a quantum circuit by reducing a critical path length that determines the execution time of the quantum circuit. Disclosed herein SHA-256 quantum circuit design apparatus and method. According to an embodiment of the present disclosure, there is provided an SHA-256 quantum circuit design apparatus comprising: a reception unit configured to receive an SHA-256 quantum circuit having a length of a critical path consisting of six adders; and a design unit configured to design a first SHA-256 quantum circuit having the critical path length reduced to a first value by applying a path balancing technique to the received SHA-256 quantum circuit and to design a second SHA-256 quantum circuit having the critical path length reduced to a second value by applying the path balancing technique to the first SHA-256 quantum circuit to output a d+T1 value first.

According to the embodiment of the present disclosure, wherein the design unit designs the first quantum circuit that first outputs a T1 value by iteratively applying the path balancing technique a certain number of times or more.

According to the embodiment of the present disclosure, wherein the design unit designs the second SHA-256 quantum circuit in which 11 additions and one subtraction are performed per round.

According to the embodiment of the present disclosure, wherein the design unit designs the second SHA-256 quantum circuit in which eight adder circuits and one subtractor circuit are used in a round function algorithm and three adder circuits are used in a message scheduling algorithm.

According to the embodiment of the present disclosure, wherein the design unit designs the second SHA-256 quantum circuit iteratively performed a total of 65 times by applying the path balancing technique.

According to the embodiment of the present disclosure, wherein the design unit designs the second SHA-256 quantum circuit in which the critical path length per round is 3.

According to another embodiment of the present disclosure, there is provided an SHA-256 quantum circuit design method comprising: receiving an SHA-256 quantum circuit having a length of a critical path consisting of six adders; and designing a first SHA-256 quantum circuit having the critical path length reduced to a first value by applying a path balancing technique to the received SHA-256 quantum circuit; and designing a second SHA-256 quantum circuit having the critical path length reduced to a second value by applying the path balancing technique to the first SHA-256 quantum circuit to output a d+T1 value first.

The features briefly summarized above with respect to the present disclosure are merely exemplary aspects of the detailed description below of the present disclosure, and do not limit the scope of the present disclosure.

According to the present disclosure, it is possible to provide an SHA-256 quantum circuit design apparatus and method for reducing an execution time of a quantum circuit by reducing a critical path length that determines the execution time of the quantum circuit.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

In order to efficiently perform SHA-256 calculations through quantum computing, it is necessary to implement a quantum circuit that can quickly calculate an SHA-256 algorithm. The critical path of the existing SHA-256 quantum circuit consists of 7 or 9 quantum adders.

Embodiments of the present disclosure are to design a more efficient SHA-256 quantum circuit by reducing the number of quantum adders constituting a critical path of the SHA-256 quantum circuit to three.

Here, the embodiments of the present disclosure may reduce the execution time of the SHA-256 quantum circuit by reducing a critical path or critical path length that determines the execution time of the quantum circuit.

The SHA-256 hash algorithm consists of two steps: a size preprocessing step and a hash computation step. In the preprocessing step, an original message is received and padded so that a length is a multiple of 512 bits. In this case, the length of the original message shall be less than 264. That is, the length of the message shall be able to be expressed in 64 bits. When the number of 512-bit message blocks is N, it is assumed that N is 1 in the quantum circuit. The reason is that a round function algorithm is performed on each message block, and an intermediate hash value update operation is performed after this round function algorithm is finished. Due to the no-cloning theorem, the round function algorithm cannot be performed on the next message block after the update operation. Therefore, the maximum length of a message capable of being handled in the quantum circuit is 447, because the minimum length of padding in one message block is 65.

In the hash calculation step, a hash value is created. The hash calculation step consists of a round function algorithm and a message scheduling algorithm. The round function algorithm is iteratively performed 64 times for one message block. All additions are performed in module 232. In the message scheduling algorithm, 48 words $W_t$ (t=16, ..., 63) are created using 16 words $W_t$ (t=0, ..., 15) with a 32-bit size, which are created by dividing 512 bits of the message block into 16 equal parts. One word is used as an operand in the corresponding round, and used logical functions include $\sigma_0(x)$ and $\sigma_1(x)$.

An initial hash value, H(0), is a 256-bit constant value and is assigned to eight 32-bit internal variables a, b, c, d, e, f, g, and h used in the round function algorithm. A total of 64 32-bit constant values $K_0, \ldots, K_{63}$ are also added by being used as operands in the corresponding round like Wt described above. As the used logical functions, Maj, Ch, $\Sigma_0(x)$, $\Sigma_1(x)$ are used. The calculation process occurring in each round may be expressed through Equation 1 below.

$$W_t = M_t^{(1)} \quad\quad 0 \le t \le 15 \quad\quad \text{[Equation 1]}$$
$$= \sigma_1(W_{t-2}) + W_{t-7} + \sigma_0(W_{t-15}) + W_{t-16} \quad 16 \le t \le 63$$

where $$\sigma_0(x) = ROTR^7(x) \oplus ROTR^{18}(x) \oplus SHR^3(x),$$
$$\sigma_1(x) = ROTR^{17}(x) \oplus ROTR^{19}(x) \oplus SHR^{10}(x)$$
$$h = g,$$
$$g = f,$$
$$f = e,$$
$$e = d + T_1,$$
$$d = c,$$
$$c = b,$$
$$b = a,$$
$$a = T_1 + T_2$$

where $$T_1 = h + \Sigma_1(e) + Ch(e, f, g) + K_t + W_t,$$
$$T_2 = \Sigma_0(a) + Maj(a, b, c),$$
$$Maj(x, y, z) = (x \wedge y) \oplus (x \wedge z) \oplus (y \wedge z).$$
$$Ch(x, y, z) = (x \wedge y) \oplus (\neg x \wedge z),$$
$$\Sigma_0(x) = ROTR^2(x) \oplus ROTR^{13}(x) \oplus ROTR^{22}(x).$$
$$\Sigma_1(x) = ROTR^6(x) \oplus ROTR^{11}(x) \oplus ROTR^{25}(x)$$

After 64-round iteration is completed, the intermediate hash value update process occurs as described above. The existing hash value H(i−1) is added to the internal variables a, b, c, d, e, f, g, and h and updated to H(i). At this time, since it is assumed that the number N of message blocks is 1, i=1. As a result, a 256-bit hash value H(1)=H(1)=H0(1)‖H1

(1)‖ . . . ‖H7(1) may be obtained, and H0(1) to H7 (1) and may be expressed as Equation 2 below.

$$H_0^{(1)}=H_0^{(0)}+a, H_1^{(1)}=H_1^{(0)}+b, H_2^{(1)}=H_2^{(0)}+c, H_3^{(1)}=H_3^{(0)}+d, H_4^{(1)}=H_4^{(0)}+e, H_5^{(1)}=H_5^{(0)}+f, H_6^{(1)}=H_6^{(0)}+g, H_7^{(1)}=H_7^{(0)}+h$$ [Equation 2]

Figure 1:
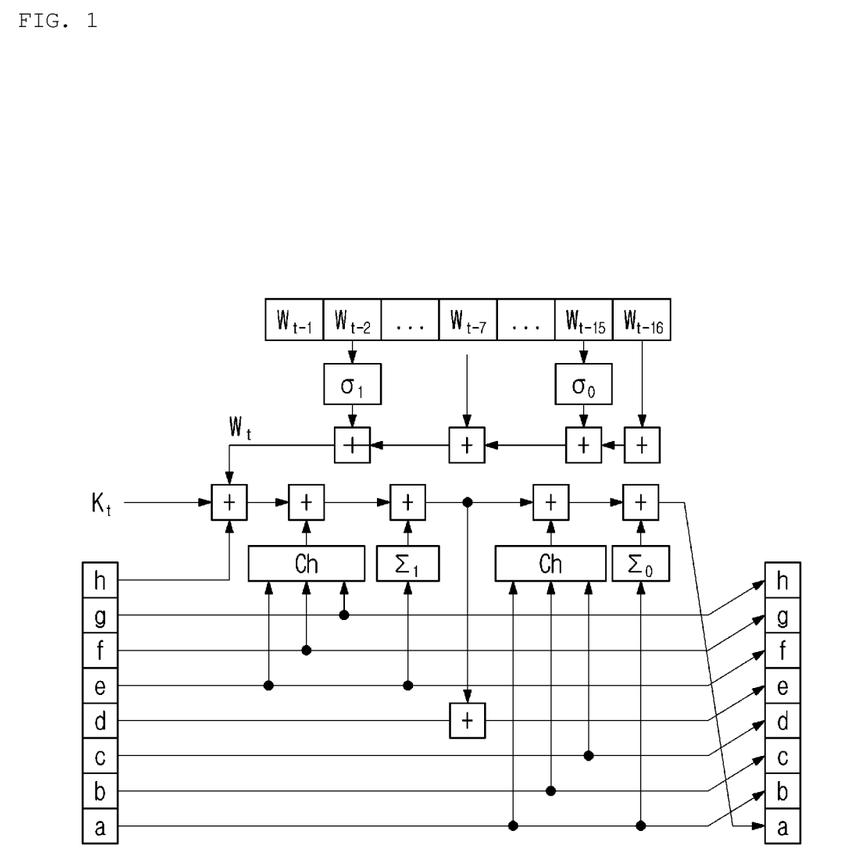
FIG. 1 is a view illustrating an example of an SHA-256 hash algorithm.

FIG. 1 is a view illustrating an example of an SHA-256 hash algorithm, which shows the entire process of the SHA-256 hash algorithm.

As shown in FIG. 1, in the SHA-256 circuit made of a classical circuit, the critical path is a section in which 7 operands are added using 6 adders to make an output value $T_1+T_2$. In the round function algorithm, this value is updated a total of 64 times and is assigned to an internal variable a each time. Since values that need to be generated every round are $d+T_1$ and $T_1+T_2$, if $T_1$ is first created and then d and $T_2$ are added to $T_1$, it can be seen that at least 7 additions are required for every round.

Existing SHA-256 quantum circuits made of quantum circuits consist of quantum gates belonging to a Clifford+T set, which is a standard full fault-tolerant set, and were made in various versions to process the round function algorithm and the message scheduling algorithm in series or in parallel. The reason why they were made in various versions is because the number of qubits and T-depth, which determine space-time complexity, vary in making the quantum circuit for each version. For reference, in a quantum circuit, the number of qubits determines spatial complexity, and the T-depth determines time complexity. Here, the T-depth means a depth formed by a T gate in the critical path. The SHA-256 quantum circuit of the embodiment of the present disclosure is designed based on the Clifford+T set, like the previously presented circuits, and can process a round function algorithm and a message scheduling algorithm in parallel.

Figure 2:
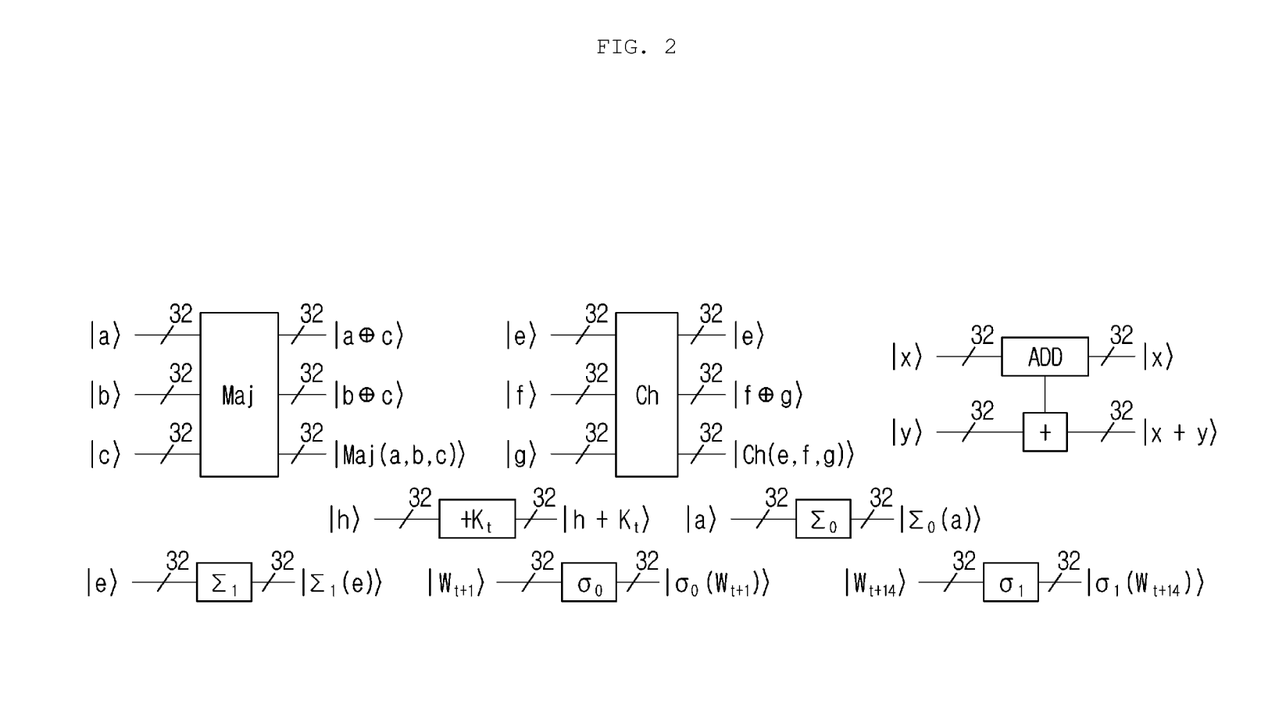
FIG. 2 is a view illustrating internal function blocks constituting an SHA-256 quantum circuit.

FIG. 2 is a view illustrating internal function blocks constituting an SHA-256 quantum circuit.

The T gate that determines the execution time in the quantum circuit is the most used in an adder among internal function blocks. Accordingly, embodiments of the present disclosure aim to reduce the length of the critical path made of these adders. In the $\Sigma_0(x)$, $\Sigma_1(x)$, $\sigma_0(x)$ and $\sigma_1(x)$ function blocks, the T gate is not used at all and consists only of control NOT (CNOT) gates with a relatively short execution time. Therefore, the $\Sigma_0(x)$, $\Sigma_1(x)$, $\sigma_0(x)$ and $\sigma_1(x)$ function blocks do not significantly affect the performance and speed of the quantum circuit. In the Maj and Ch function blocks, the number of used T gates is very small compared to the quantum adder that performs 32-bit modulo addition. That is, the performance of the quantum circuit is determined according to the number of consecutive quantum adders constituting the critical path.

The quantum circuit basically consists of reversible circuits. As shown in FIG. 2, all of the $\Sigma_0(x)$, $\Sigma_1(x)$, $\sigma_0(X)$, $\sigma_1(X)$, Maj and Ch function blocks use 32 qubits to receive a 32-bit value and to output a 32-bit value. The number of qubits and T-depth used vary depending on which type of adder is used at a quantum constant adder used when adding the constant $K_t$ and a general quantum adder where both operands are variables. For reference, among the quantum adders, there are specialized adders that may be used when one of the two operands has a fixed value as a constant.

Here, the constant adder function block +$K_t$ adds $K_t$ to an input operand and outputs the added value, and the quantum adder outputs an operand input in an ADD stage without change, and adds two operands input in a (+) stage and outputs the added value. Other function blocks also output a specific result value by performing an arithmetic function on at least one operand.

The SHA-256 quantum circuit according to an embodiment of the present disclosure uses a path balancing technique that makes some operations be performed in a next operation, and creates $d+T_1$ first, instead of $T_1$, which is commonly required to create $d+T_1$ and $T_1+T_2$, thereby reducing the length of the critical path.

Figure 3:
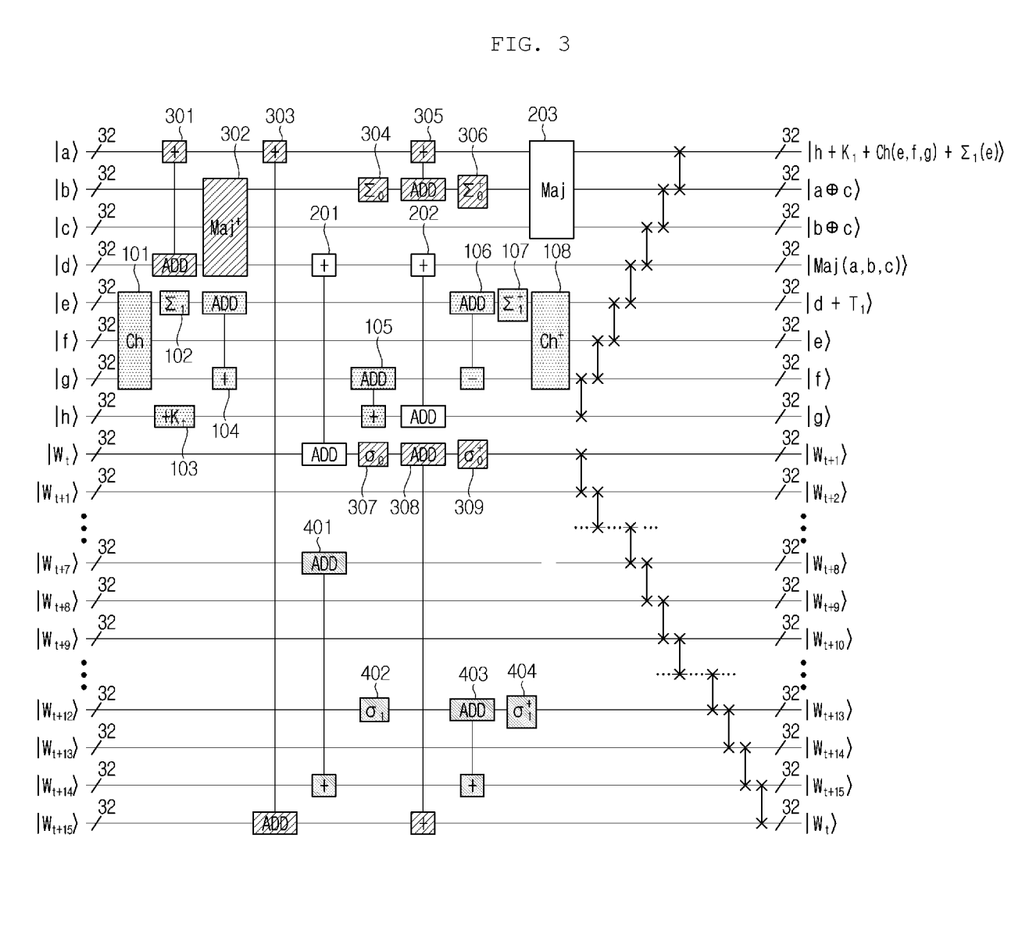
FIG. 3 is a view illustrating one round of an SHA-256 quantum circuit according to an embodiment of the present disclosure.

FIG. 3 is a view illustrating one round of an SHA-256 quantum circuit according to an embodiment of the present disclosure. A time direction in the quantum circuit is from left to right.

As shown in FIG. 3, in the SHA-256 quantum circuit, 11 additions and 1 subtraction are performed per round. At this time, subtraction is used to restore the internal variables e, f, and g. If the subtractor version of the quantum adder to be used is used for subtraction, the performance of the adder and the subtractor is the same.

Furthermore, in the SHA-256 quantum circuit according to an embodiment of the present disclosure, it can be seen that $W_t$ is added twice in order to create d+T1 as quickly as possible. In the round function algorithm, 8 adder circuits and 1 subtracter circuit are used, and, in the message scheduling algorithm, 3 adder circuits are used. As mentioned earlier, these two algorithms are processed in parallel. In a t-th round, an adder circuit having a long vertical line located on the left side of FIG. 3 is an adder circuit belonging to the round function algorithm because it is present to add Wt−1.

$100^{th}$ Gates 101 to 108 shown in FIG. 3 constitute a critical path, $300^{th}$ gates 301 to 309 are added from a second round, and $400^{th}$ gates 401 to 404 are added from a third round. In addition, 2-qubit gates located at the end of each round are SWAP gates that change the position of a circuit line. As shown in FIG. 3, the SHA-256 quantum circuit may operate by a total of 24 gate blocks, including inverse gate blocks ($\Sigma_0$† function block, $\Sigma_1$† function block, $\sigma_0$† function block, $\sigma_1$† function block, Maj† function block and Ch† function block) with respect to function blocks except for the adder circuit, that is, $\Sigma_0$ function block, $\Sigma_1$ function block, $\sigma_0$ function block, $\sigma_1$ function block, Maj function block and Ch function block.

In the process of calculating $d+T_1$ first in the first round, since only the $100^{th}$ and $200^{th}$ gates operate in the first round in the SHA-256 quantum circuit, output values using the $100^{th}$ and $200^{th}$ gates will be described. The input variables e, f, g are input to the Ch function block 101, and Ch(e,f,g)+$\Sigma_1$(e) is output at the (+) stage of the general adder function block 104 through the $\Sigma_1$ function block 102 and the general adder function block 104. In addition, h+$K_t$ is output by adding $K_t$ to h in the constant adder function block 103, and d+$W_t$ is output by adding two operands d and $W_t$ input at the (+) stage of the general adder function block 201. The (+) stage of the general adder function block 105 outputs h+$K_t$+Ch(e,f,g)+$\Sigma_1$(e) by adding the two operands Ch(e,f,g)+$\Sigma_1$(e) and h+$K_t$ input to the corresponding function block 105, and the (+) stage of the general adder function block 202 outputs d+h+$K_t$+Ch(e,f,g)+$\Sigma_1$(e)+$W_t$, that is, $d+T_1$, by adding two operands d+$W_t$ and h+$K_t$+Ch(e,f,g)+$\Sigma_1$(e) input to the corresponding function block 202. In $d+T_1$ output in this way, e is updated to $d+T_1$ through the SWAP gate. This process is performed through all function blocks, and the value of the operand is updated using gates constituting the quantum circuit for each round. The value h+$K_t$+Ch(e,f,g)+$\Sigma_1$(e) in the first round is updated to $T_1+T_2$, by sequentially adding Maj(a,b,c), $W_t$ and $\Sigma_0$(a) to the corresponding value in the next round. As such, the SHA-256 quantum circuit according to the embodiment of the present disclosure does not first create $T_1$, which is a common factor of $T_1+T_2$ and $d+T_1$, but first create $d+T_1$ and then creates $T_1+T_2$ in the next round to reduce the critical path. This updated internal variable a is used as the operand of the Maj function of the corresponding round.

The upper part of the whole circuit is a round function algorithm, and the lower part is a message scheduling algorithm. This quantum circuit must be iterated a total of 65 times to complete the work of the entire SHA-256 quantum circuit. This is different from the classical circuit that ends when this part is iteratively performed 64 times. This difference occurs because an operation that shall be executed in a $64^{th}$ round is shifted to a $65^{th}$ round using the path balancing technique. In the final $65^{th}$ round, only the $300^{th}$ gates shifted from the $64^{th}$ round due to the path balancing technique among the gates constituting the round function algorithm. The message scheduling algorithm starts at a second round and ends at a $50^{th}$ round, and the round function algorithm starts at a first round and ends at a $65^{th}$ round. As a result, it can be seen that there are only three consecutive adders constituting the critical path. In the front part of the critical path, if the T-depth of the adder 103 used to add the constant $K_t$ is larger, this constant adder 103 will constitute the critical path and, if the T-depth of the general adder circuit performed in the same time slice is larger, this general adder will be included in the critical path.

As such, the SHA-256 quantum circuit according to an embodiment of the present disclosure reduces the existing critical path from 6 to 3 per round by applying a path balancing technique and a method of creating $d+T_1$ first, thereby reducing the execution time of the SHA-256 quantum circuit. The SHA-256 quantum circuit according to the embodiment of the present disclosure may be used to perform various quantum attack algorithms, which is apparent to those skilled in the art.

In addition, the SHA-256 quantum circuit according to the embodiment of the present disclosure performs calculations in the SHA-256 quantum circuit more efficiently, because a circuit configuration with a much shorter critical path than the conventional SHA-256 quantum circuit is possible.

Figure 4:
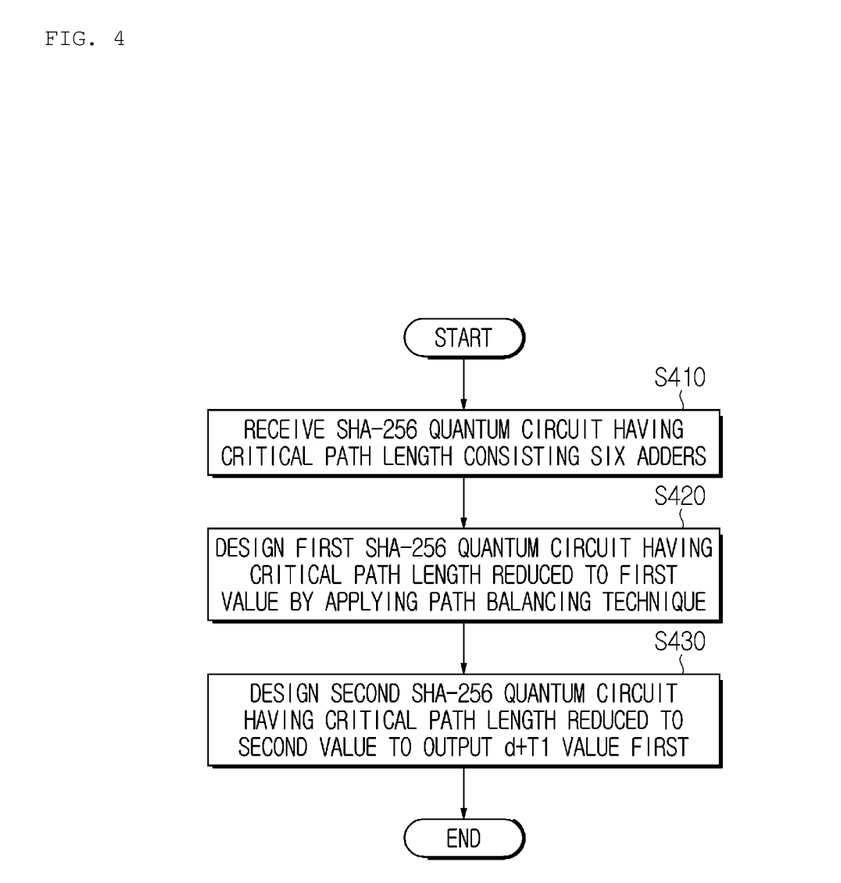
FIG. 4 is a flowchart illustrating an SHA-256 quantum circuit design method according to another embodiment of the present disclosure.

FIG. 4 is a flowchart illustrating an SHA-256 quantum circuit design method according to another embodiment of the present disclosure, and is a flowchart illustrating a process of designing an SHA-256 quantum circuit of FIG. 3.

Referring to FIG. 4, the SHA-256 quantum circuit design method according to another embodiment of the present disclosure receives an SHA-256 quantum circuit having a length of a critical path consisting of six adders and designs a first SHA-256 quantum circuit having a critical path length reduced to a first value, for example, 5 or 4, by applying a path balancing technique to the received SHA-256 quantum circuit (S410 and S420).

In step S420, the first quantum circuit that outputs a T1 value first may be designed by iteratively applying the path balancing technique a certain number of times or more.

When the first SHA-256 quantum circuit is designed in step S420, a second SHA-256 quantum circuit having the critical path length reduced to a second value, for example, 3, that is, a final SHA-256 quantum circuit, is designed, by applying the path balancing technique to the first SHA-256 quantum circuit to first output a d+T1 value (S430).

In this case, in step S430, the second SHA-256 quantum circuit in which 11 additions and one subtraction are performed per round may be designed, the second SHA-256 quantum circuit in which eight adder circuits and one subtractor circuit are used in the round function algorithm and three adder circuits are used in the message scheduling algorithm may be designed.

In this case, the second SHA-256 quantum circuit designed in step S430 may be iteratively performed a total of 65 times by applying the path balancing technique, and, in the second SHA-256 quantum circuit designed in step S430, a critical path length per round may be 3.

Although the description of the method of FIG. 4 is omitted, the design method according to the embodiment of the present disclosure may include all the contents described with reference to FIGS. 1 to 3, which is apparent to those skilled in the art.

Figure 5:
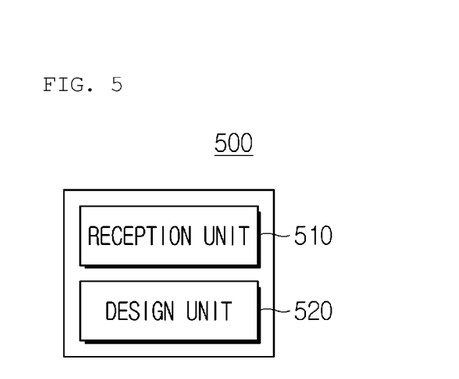
FIG. 5 is a view illustrating a configuration of an SHA-256 quantum circuit design method according to another embodiment of the present disclosure.

FIG. 5 is a view illustrating a configuration of an SHA-256 quantum circuit design method according to another embodiment of the present disclosure, which illustrates a configuration of the apparatus for performing the method of FIG. 4.

Referring to FIG. 5, the SHA-256 quantum circuit design apparatus 500 according to an embodiment of the present disclosure includes a reception unit 510 and a design unit 520.

The reception unit 510 receives an SHA-256 quantum circuit having a length of a critical path consisting of six adders.

The design unit 520 designs a first SHA-256 quantum circuit having a critical path length reduced to a first value, for example, 5 or 4, by applying a path balancing technique to the received SHA-256 quantum circuit, and designs a second SHA-256 quantum circuit having a critical path length reduced to a second value, for example, 3, that is, a final SHA-256 quantum circuit, by applying the path balancing technique to the first SHA-256 quantum circuit to first output a d+T1 value.

In this case, the design unit 520 may design the first quantum circuit that outputs a T1 value first, by iteratively applying the path balancing technique a certain number of times or more.

In this case, the design unit 520 may design the second SHA-256 quantum circuit in which 11 additions and one subtraction are performed per round, and may design the second SHA-256 quantum circuit in which eight adder circuits and one subtractor circuit are used in the round function algorithm and three adder circuits are used in the message scheduling algorithm.

In this case, the second SHA-256 quantum circuit designed by the design unit 520 may be iteratively performed a total of 65 times by applying the path balancing technique, and, in the second SHA-256 quantum circuit designed by the design unit 520, a critical path length per round may be 3.

Although the description of the apparatus of FIG. 5 is omitted, the design apparatus according to the embodiment of the present disclosure may include all the contents described with reference to FIGS. 1 to 4, which is apparent to those skilled in the art.

Figure 6:
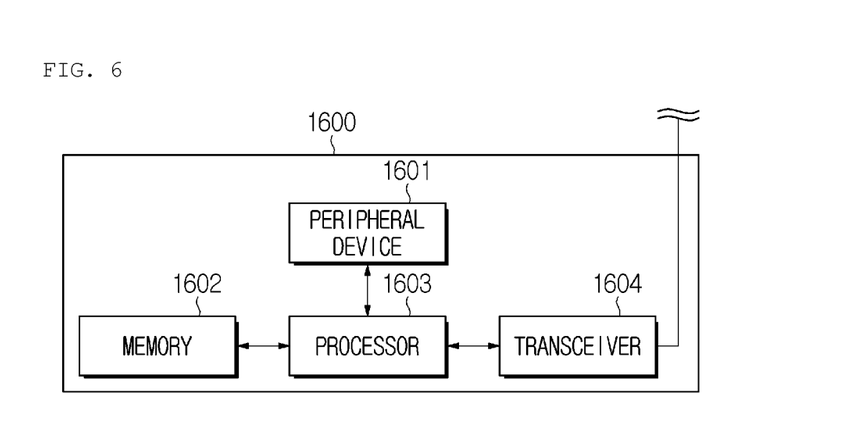
FIG. 6 is a view illustrating a configuration of a device, to which an SHA-256 quantum circuit design apparatus according to another embodiment of the present disclosure is applied.

FIG. 6 is a view illustrating a configuration of a device, to which an SHA-256 quantum circuit design apparatus according to another embodiment of the present disclosure is applied.

The SHA-256 quantum circuit design apparatus according to an embodiment of the present disclosure of FIG. 5 may be a device 1600 of FIG. 6. Referring to FIG. 6, the device 1600 may include a memory 1602, a processor 1603, a transceiver 1604 and a peripheral device 1601. In addition, for example, the device 1600 may further include another configuration and is not limited to the above-described embodiment. Herein, for example, the device 1600 may be a mobile user terminal (e.g., a smartphone, a laptop, a wearable device, etc.) or a fixed management device (e.g., a server, a PC, etc.).

More specifically, the device 1600 of FIG. 6 may be an exemplary hardware/software architecture such as a quantum circuit design apparatus and a quantum circuit implementation reduction apparatus. Herein, as an example, the memory 1602 may be a non-removable memory or a removable memory. In addition, as an example, the peripheral device 1601 may include a display, GPS or other peripherals and is not limited to the above-described embodiment.

In addition, as an example, like the transceiver 1604, the above-described device 1600 may include a communication circuit. Based on this, the device 1600 may perform communication with an external device.

In addition, as an example, the processor 1603 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1600. In addition, the processor 1603 may be performed by modularizing the functions of the design unit 520 of FIG. 15.

Herein, the processor 1603 may execute computer-executable commands stored in the memory 1602 in order to implement various necessary functions of the SHA-256 quantum circuit design apparatus. As an example, the processor 1603 may control at least any one operation among signal coding, data processing, power controlling, input and output processing, and communication operation. In addition, the processor 1603 may control a physical layer, an MAC layer and an application layer. In addition, as an example, the processor 1603 may execute an authentication and security procedure in an access layer and/or an application layer but is not limited to the above-described embodiment.

In addition, as an example, the processor 1603 may perform communication with other devices via the transceiver 1604. As an example, the processor 1603 may execute computer-executable commands so that the SHA-256 quantum circuit design apparatus may be controlled to perform communication with other devices via a network. That is, communication performed in the present invention may be controlled. As an example, the transceiver 1604 may send a RF signal through an antenna and may send a signal based on various communication networks.

In addition, as an example, MIMO technology and beam forming technology may be applied as antenna technology but are not limited to the above-described embodiment. In addition, a signal transmitted and received through the transceiver 1604 may be controlled by the processor 1603 by being modulated and demodulated, which is not limited to the above-described embodiment.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. An SHA-256 quantum circuit design apparatus comprising:
   a reception unit configured to receive an SHA-256 quantum circuit having a length of a critical path consisting of six adders; and
   a design unit configured to design a first SHA-256 quantum circuit having the critical path length reduced to a first value by applying a path balancing technique to the received SHA-256 quantum circuit and to design a second SHA-256 quantum circuit having the critical path length reduced to a second value by applying the path balancing technique to the first SHA-256 quantum circuit to output a d+T1 value first.

2. The SHA-256 quantum circuit design apparatus of claim 1, wherein the design unit designs the first quantum circuit that first outputs a T1 value by iteratively applying the path balancing technique a certain number of times or more.

3. The SHA-256 quantum circuit design apparatus of claim 1, wherein the design unit designs the second SHA-256 quantum circuit in which 11 additions and one subtraction are performed per round.

4. The SHA-256 quantum circuit design apparatus of claim 3, wherein the design unit designs the second SHA-256 quantum circuit in which eight adder circuits and one subtractor circuit are used in a round function algorithm and three adder circuits are used in a message scheduling algorithm.

5. The SHA-256 quantum circuit design apparatus of claim 1, wherein the design unit designs the second SHA-256 quantum circuit iteratively performed a total of 65 times by applying the path balancing technique.

6. The SHA-256 quantum circuit design apparatus of claim 1, wherein the design unit designs the second SHA-256 quantum circuit in which the critical path length per round is 3.

7. An SHA-256 quantum circuit design method comprising:
   receiving an SHA-256 quantum circuit having a length of a critical path consisting of six adders; and designing a first SHA-256 quantum circuit having the critical path length reduced to a first value by applying a path balancing technique to the received SHA-256 quantum circuit; and designing a second SHA-256 quantum circuit having the critical path length reduced to a second value by applying the path balancing technique to the first SHA-256 quantum circuit to output a d+T1 value first.

8. The SHA-256 quantum circuit design method of claim 7, wherein the designing the first qSHA-256 quantum circuit comprises designing the first SHA-256 quantum circuit that first outputs a T1 value by iteratively applying the path balancing technique a certain number of times or more.

9. The SHA-256 quantum circuit design method of claim 7, wherein the designing the second SHA-256 quantum circuit comprises designing the second SHA-256 quantum circuit in which 11 additions and one subtraction are performed per round.

10. The SHA-256 quantum circuit design method of claim 9, wherein the designing the second SHA-256 quantum circuit comprises designing the second SHA-256 quantum circuit in which eight adder circuits and one subtractor circuit are used in a round function algorithm and three adder circuits are used in a message scheduling algorithm.

11. The SHA-256 quantum circuit design method of claim 7, wherein the designing the second SHA-256 quantum circuit comprises designing the second SHA-256 quantum circuit iteratively performed a total of 65 times by applying the path balancing technique.

12. The SHA-256 quantum circuit design method of claim 7, wherein the designing the second SHA-256 quantum circuit comprises designing the second SHA-256 quantum circuit in which the critical path length per round is 3.

* * * * *